United States Patent
Hariharan

(10) Patent No.: US 8,680,784 B2
(45) Date of Patent: Mar. 25, 2014

(54) DIMMABLE OFFLINE LED DRIVER

(75) Inventor: Suresh Hariharan, Livermore, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 13/161,278

(22) Filed: Jun. 15, 2011

(65) Prior Publication Data

US 2012/0212134 A1   Aug. 23, 2012

Related U.S. Application Data

(60) Provisional application No. 61/354,983, filed on Jun. 15, 2010.

(51) Int. Cl.
*H05B 37/02* (2006.01)

(52) U.S. Cl.
USPC ........ 315/297; 315/201; 315/209 R; 315/210; 315/291; 315/307

(58) Field of Classification Search
USPC .......... 315/200 R, 201, 209 R, 210, 246, 247, 315/291, 294, 297, 307, 308
See application file for complete search history.

(56) References Cited

U.S. PATENT DOCUMENTS

| | | | | |
|---|---|---|---|---|
| 7,852,017 | B1* | 12/2010 | Melanson | 315/291 |
| 8,410,718 | B2* | 4/2013 | Anissimov | 315/291 |
| 2004/0085030 | A1* | 5/2004 | Laflamme et al. | 315/291 |
| 2005/0275354 | A1* | 12/2005 | Hausman et al. | 315/291 |
| 2006/0002155 | A1* | 1/2006 | Shteynberg et al. | 363/21.12 |
| 2009/0195168 | A1* | 8/2009 | Greenfeld | 315/192 |
| 2010/0090604 | A1* | 4/2010 | Maruyama et al. | 315/119 |
| 2011/0121754 | A1* | 5/2011 | Shteynberg et al. | 315/294 |
| 2011/0248640 | A1* | 10/2011 | Welten | 315/210 |

FOREIGN PATENT DOCUMENTS

WO   WO2010027254 A1   3/2010
WO   WO2010035155 A2   4/2010

OTHER PUBLICATIONS

PCT Search Report and Written Opinion, received for co-pending PCT application PCT/US2011/040548; mailed on Oct. 18, 2011.

* cited by examiner

*Primary Examiner* — Douglas W Owens
*Assistant Examiner* — Thai Pham
(74) *Attorney, Agent, or Firm* — North Weber & Baugh LLP

(57) ABSTRACT

Embodiments of the present invention provide a system and method for controlling the amplitude of a current from a diode bridge into an EMI filter and LED array. Due to the manner in which certain dimmers (i.e., leading edge dimmers) operate, there is a delay on its output in transmitting a voltage when the voltage crosses zero.

20 Claims, 6 Drawing Sheets

DIMMABLE OFFLINE LED DRIVER

CROSS REFERENCE TO RELATED PATENT APPLICATIONS

This application claims priority to U.S. Provisional Application Ser. No. 61/354,983, entitled "Dimmable Offline LED Driver," filed Jun. 15, 2010, which application is incorporated herein by reference in its entirety.

BACKGROUND

1. Field of the Invention

The present invention relates to dimming operations within an LED system. More particularly, certain embodiments of the present invention relate to controlling regulation within an LED system such that a dimming operation results in a relatively smooth transition of light intensity with minimal flickering.

2. Background of the Invention

The benefits and wide-range applicability of LEDs in today's lighting systems are now realized and recognized by those skilled in the art. For many years, halogen-based lamps were the primary light source implemented within lighting systems. Over the past years as LED technology has developed, the advantages of LEDs over halogen lamps have become increasingly apparent. When compared to halogen lamps, LEDs are relatively smaller, and have a longer operating life. Another important difference between halogen bulbs and LEDs is the significantly less amount of power required by LEDs to operate. For example, a halogen lamp may operate within a range of 20-50 Watts and an LED at about 5-15 Watts.

When LEDs are used for lighting applications, a cluster or an array of LEDs is used to achieve the requisite brightness and other desired lighting characteristics. One or more LED drivers are used to effectively control the electrical characteristics of the array of LEDs to suit the lighting. An LED driver is a self-contained power supply that has outputs matched to the electrical characteristics of the array of LEDs.

Many LED lamps are powered in the same way as other lighting applications, namely, starting with and using an alternating current (AC) power source. Depending on the geographic location or application, the AC source could range between 100V and 240V. The frequency of these AC sources ranges between 50 Hertz and 60 Hertz. To meet energy star requirements for LED lighting applications, the required power factor has to be greater than 0.7 in residential lighting applications and greater than 0.9 in commercial lighting applications.

In applications where the power levels are higher than 25 Watts, an active power factor correction circuit is typically used to provide a regulated high voltage DC bus. This regulated bus is used to power the LEDs by a power conversion circuit. This power conversion circuit may be an isolated topology or non-isolated topology.

FIG. 1 illustrates a prior art LED system in which dimming functionality is provided. As shown, an AC input 110 is fed into a standard incandescent or trailing edge dimmer 120 that can reduce the power supplied to the LED lamp by attenuating the power on the AC signal used to drive the LED lamp. In some applications where there is no need for dimming, the AC input 110 may feed directly into the LED lamp.

A diode bridge 130 converts the AC signal into a corresponding DC signal having a current that will be used to drive the LED lamp. The output of the diode bridge 130 is coupled to an EMI filter 140 that suppresses conducted interference on the DC power line feeding into the LED driver 150. The LED driver 150 effectively regulates the current being delivered to an LED array 160 to ensure a preferred performance of the LEDs within the array.

Maintaining proper power factor correction within a dimmable LED system presents a difficult problem. The dimmer 120 causes clipping on its output signal, which may result in the LED driver 150 to inappropriately regulate the current being drawn into the LED array 160. In particular, improper regulation may result in voltage overshoots or undershoots in the LED driver signal which may cause the LED lamp to flicker during a dimming operation. The power factor is not maintained while dimming and is only maintained without the dimmer. The power factor requirement is typically needed when there is no dimmer.

This issue is particularly problematic in situations where an LED lamp is installed within a retrofitted dimmable lighting system. Examples of such retrofitted dimmable LED systems include both standard incandescent dimmable lighting systems as well as trailing edge dimmers integrated within lighting systems. What is needed is a system and method that provides a smooth dimming operation in retrofitted LED lighting systems.

SUMMARY OF THE INVENTION

Embodiments of the present invention provide a system and method for controlling the amplitude of a current from a diode bridge into an EMI filter and LED array. Due to the manner in which certain dimmers (i.e., leading edge dimmers) operate, there is a delay on its output in transmitting a voltage when the voltage crosses zero. This causes clipping on the voltage waveform from the dimmer. Standard control loops within LED drivers will attempt to compensate for this clipped voltage waveform and will cause an overshoot (and/or undershoot) on the current drawn into the LED array via an inductor within the EMI filter. In order to avoid this overshoot (and/or undershoot), voltage sensing is performed prior to the current waveform entering into the EMI filter. This sensed information is provided to a controller so that regulation can compensate for the clipped waveform from the dimmer and appropriately perform in its current regulation operation. In certain embodiments of the invention, the controller does not start regulating the current into the LED regulator and control block until the voltage level sensed (prior to entering the EMI filter) crosses a particular threshold level.

In one example of embodiments of the present invention, voltage sensing is provided directly after the dimmer and provided on a control loop for proper regulation. An AC power source and dimmer provides an AC signal into the LED lighting system. A voltage sensor (or current sensor) is coupled to receive this AC signal and detect a voltage which is fed to a regulator and control block. A diode bridge converts the AC signal into a corresponding DC signal which is then filtered by an EMI filter. The output of the EMI filter is regulated such that an appropriate current waveform is provided to regulator and control block.

The control loop from the sensor to the regulator and control block allows the timing of the regulation to compensate for clipping on the voltage waveform outputted by the dimmer. In particular, as previously mentioned, regulation of the signal is delayed until the voltage at the sensor crosses a particular threshold. In so doing, overshoot on the leading edge of the current waveform provided to the LED array is avoided.

BRIEF DESCRIPTION OF THE DRAWINGS

Reference will be made to embodiments of the invention, examples of aspects of which may be illustrated in the accompanying figures. These figures are intended to be illustrative, not limiting. Although the invention is generally described in the context of these embodiments, it should be understood that the scope of the invention is not limited to the particular embodiments thereof disclosed herein.

DETAILED DESCRIPTION OF THE INVENTION

In the following description, for the purpose of explanation, specific details are set forth in order to provide an understanding of the invention. It will be apparent, however, to one skilled in the art that the invention may be practiced without selected of these details. One skilled in the art will recognize that embodiments of the present invention, some of which are described below, may advantageously be incorporated into a number of different devices and systems. Structures and devices shown in block diagram are illustrative of exemplary embodiments of the invention and are included to avoid obscuring the invention. Furthermore, connections between components within the figures are not intended to be limited to direct connections. Rather, such connections between components may be modified, reconfigured, or otherwise changed by intermediary components.

Reference herein to "one embodiment" or "an embodiment" of the invention means that a particular feature, structure, characteristic, or function described in connection with the embodiment is included in at least one embodiment of the invention. The use of the phrase "in one embodiment" at various locations in the specification are not necessarily all references to a single embodiment of the invention.

Figure 5:
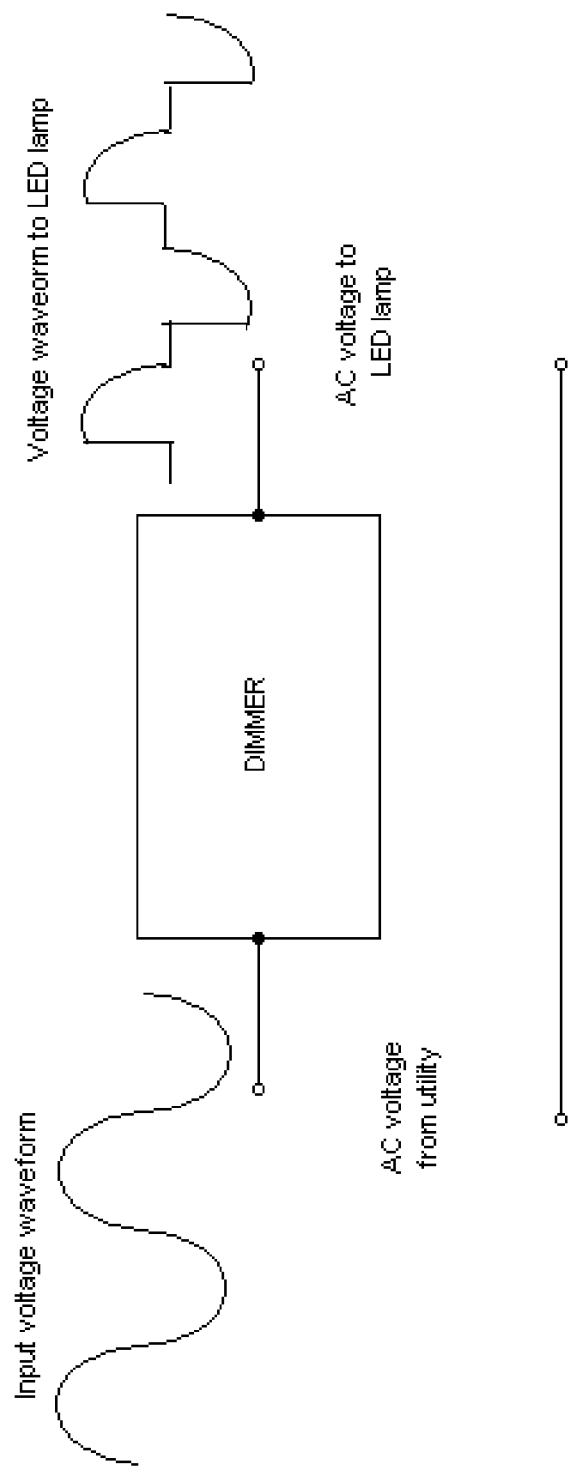
FIG. 5 generally illustrates the operation of a leading edge dimmer including signal inputs and outputs therefrom.

Embodiments of the present invention provide a system and method for controlling the amplitude of a current from a diode bridge into an EMI filter and LED array. Due to the manner in which certain dimmers (i.e., leading edge dimmers) operate, there is a delay on its output in transmitting a voltage when the voltage crosses zero. This causes clipping on the voltage waveform from the dimmer as shown in FIG. 5. Standard control loops within LED drivers will attempt to compensate for this clipped voltage waveform and will cause an overshoot (and/or undershoot) on the current drawn into the LED array via an inductor within the EMI filter. In order to avoid this overshoot (and/or undershoot), voltage sensing is performed prior to the current waveform entering into the EMI filter. This sensed information is provided to a controller so that regulation can compensate for the clipped waveform from the dimmer and appropriately perform in its current regulation operation. In certain embodiments of the invention, the controller does not start regulating the current into the LED regulator and control block until the voltage level sensed (prior to entering the EMI filter) crosses a particular threshold level.

Figure 6:
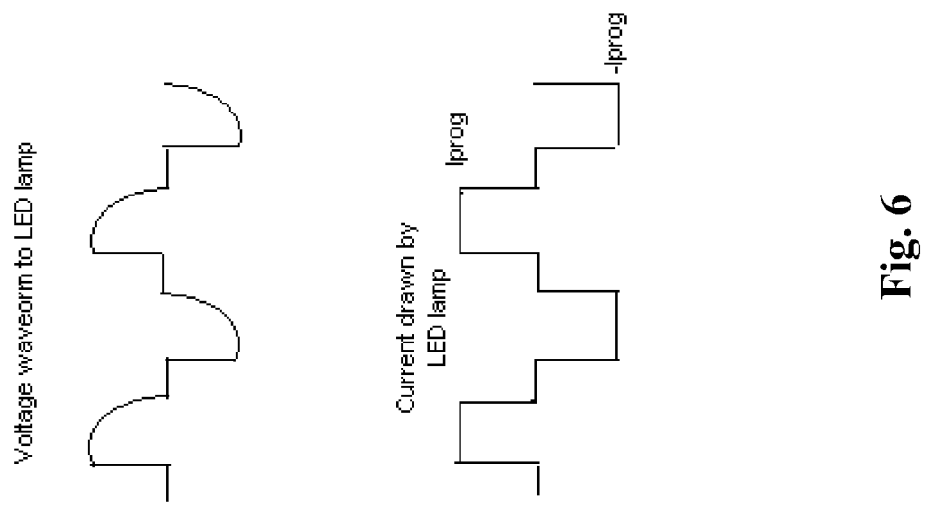
FIG. 6 illustrates input voltage waveforms and input current waveforms drawn by an LED lamp.

FIG. 6 illustrates the relationship between the voltage waveform into the LED lamp and the current drawn by the LED lamp. In cases where the clipped voltage waveform is not properly recognized, the current waveform into the LED lamp will overshoot on its leading edges because of the clipping effect on the voltage waveform. As discussed above, the overshoot (not shown in the figure) may be avoided by properly timing the regulation of the signal by the controller such that a smoother current waveform (shown in FIG. 6) is realized at the LED lamp.

Figure 1:
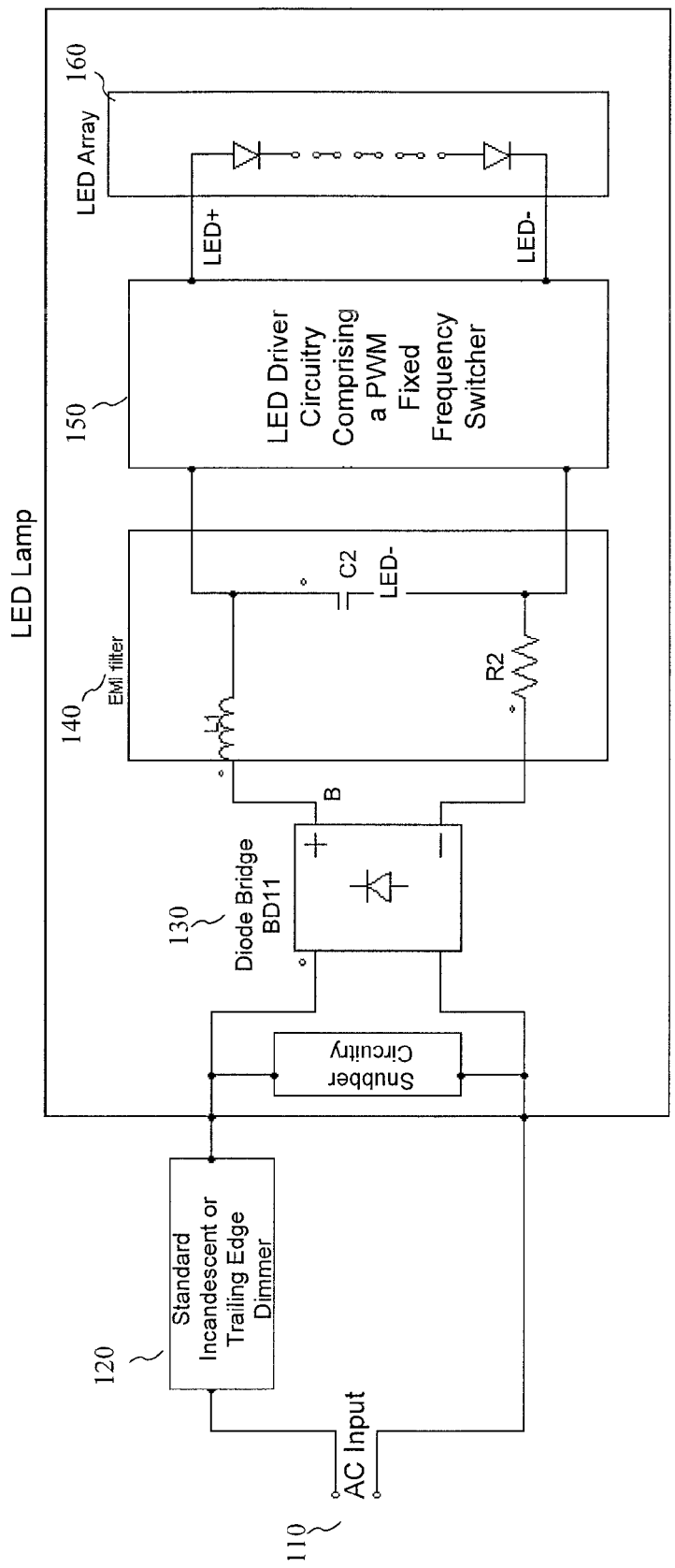
FIG. 1 illustrates an LED system including a standard incandescent or trail edge dimmer that allows an LED lamp to be dimmed by a user.
Figure 2:
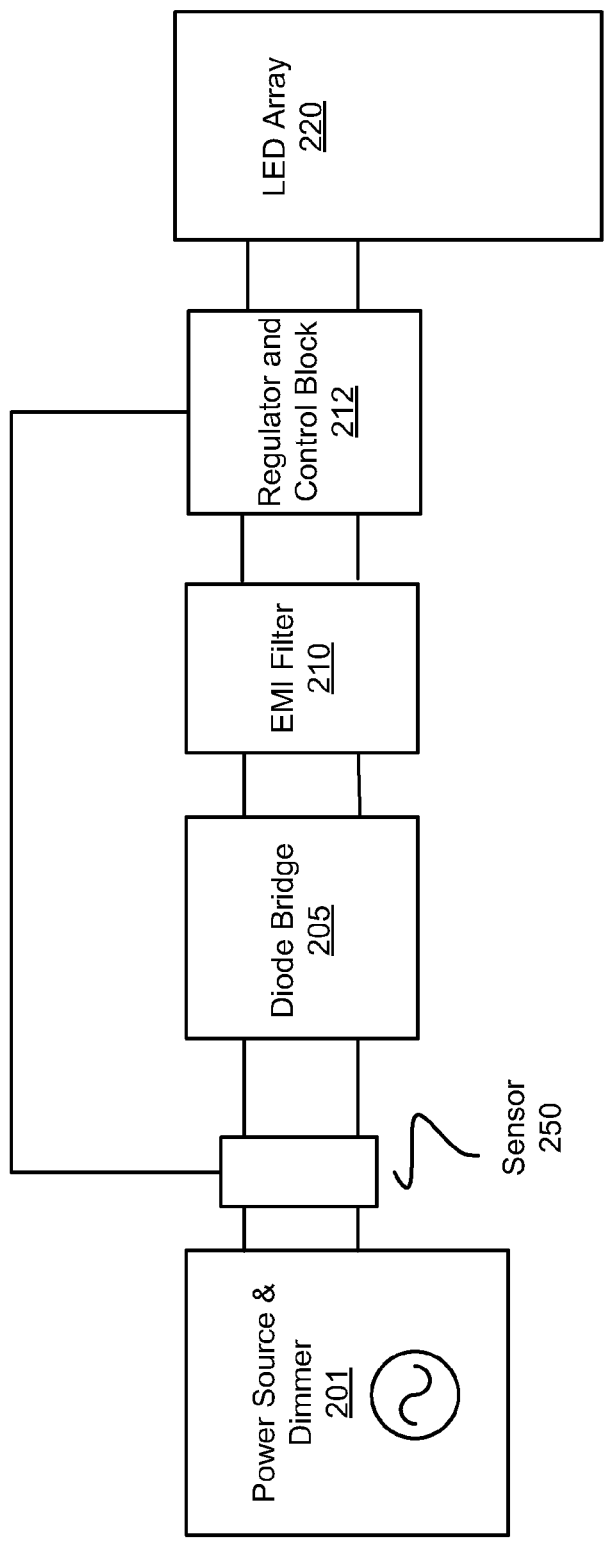
FIG. 2 is a block diagram illustrating a first dimmable LED system according to various embodiments of the invention.

FIG. 2 illustrates a first example of embodiments of the present invention in that voltage sensing is provided directly after the dimmer and provided on a control loop for proper regulation. As shown, an AC power source and dimmer 201 provide an AC signal into the LED lighting system. A voltage sensor 250 (or current sensor) is coupled to receive this AC signal and detect a voltage which is fed to a regulator and control block 212. A diode bridge 205 converts the AC signal into a corresponding DC signal which is then filtered by an EMI filter 210. The output of the EMI filter 210 is regulated such that an appropriate current waveform is provided to regulator and control block 212.

The control loop from the sensor 250 to the regulator and control block 212 allows the timing of the regulation to compensate for clipping on the voltage waveform outputted by the dimmer 201. In particular, as previously mentioned, regulation of the signal is delayed until the voltage at the sensor 250 crosses a particular threshold. In so doing, overshoot on the leading edge of the current waveform provided to the LED array 220 is avoided.

Figure 3:
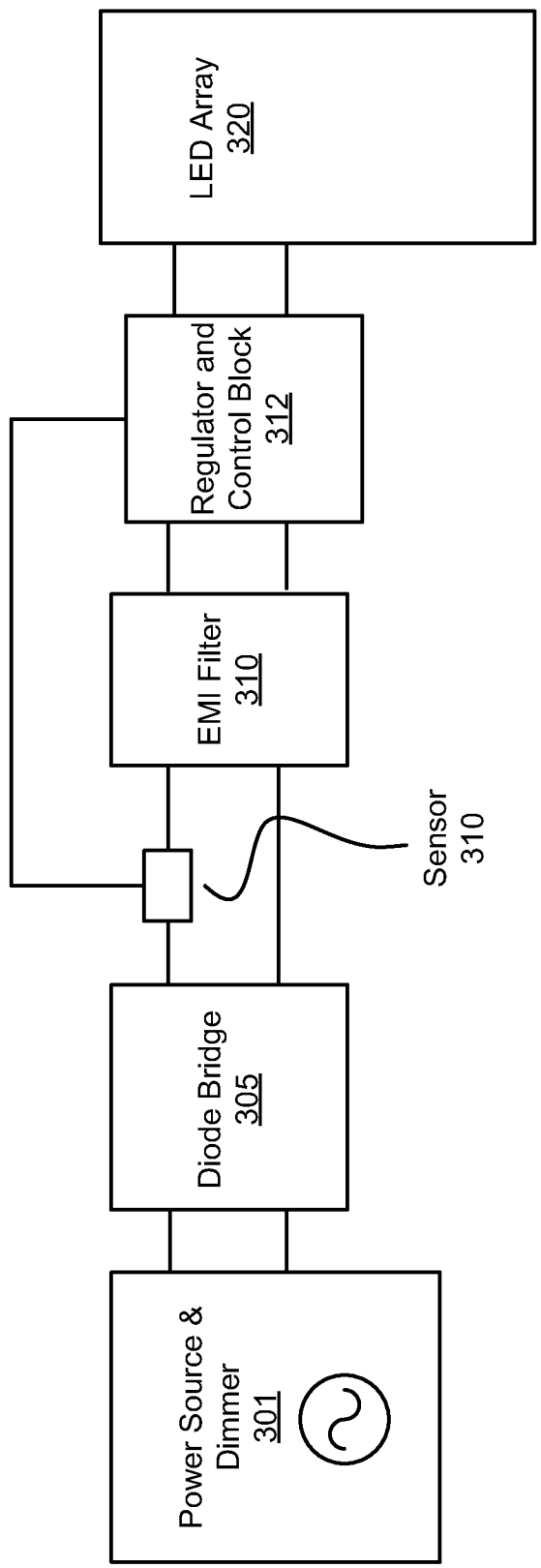
FIG. 3 is a block diagram illustrating a second dimmable LED system according to various embodiments of the invention.

FIG. 3 illustrates a second example of embodiments of the present invention in that voltage sensing is provided after a diode bridge but prior to the signal entering an EMI filter. As shown, an AC power source and dimmer 301 provides an AC signal into the LED lighting system. A diode bridge 305 converts the AC signal into a corresponding DC signal. A voltage sensor 350 (or current sensor) is coupled to receive this DC signal from the diode bridge 305 and detect a voltage which is fed to a regulator and control block 312. Thereafter, the DC signal is then filtered by an EMI filter 310. The output of the EMI filter 310 is regulated such that an appropriate current waveform is provided to the regulator and control block 312.

In a similar fashion described above, the control loop from the sensor 350 to the regulator and control block 312 allows timing of signal regulation to properly account for clipping caused by the dimmer.

Figure 4:
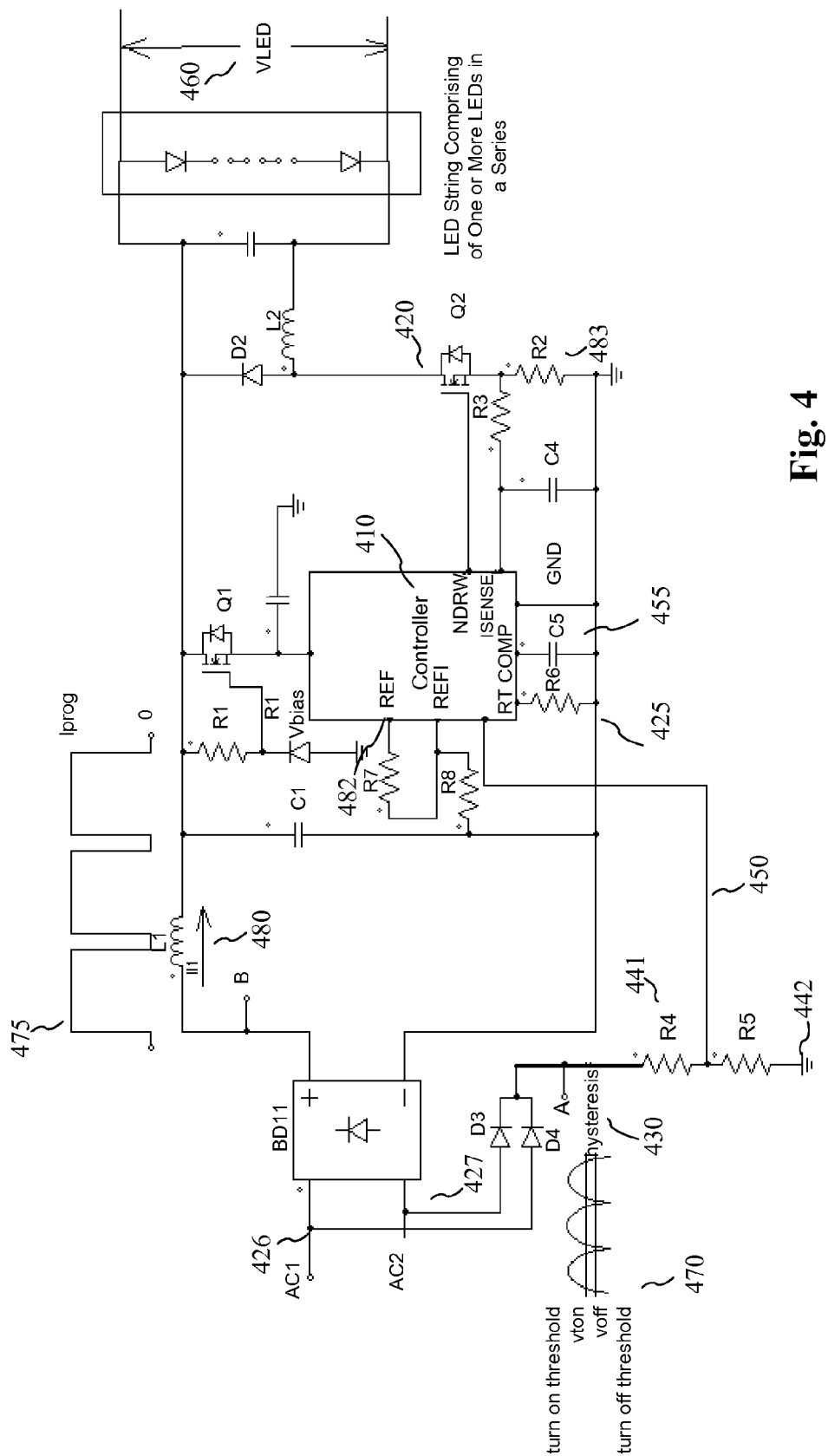
FIG. 4 is a more detailed illustration showing an offline buck LED driver according to various embodiments of the invention.

FIG. 4 illustrates a more detailed schematic of an offline buck LED driver system according to various embodiments of the invention. In this schematic, a controller 410 controls the switching of MOSFET Q2 420. The fixed switching frequency is set by the resistor R6 425 at a pin on the controller 410.

The AC voltage after a dimmer is applied to the LED driver board on terminals AC1 426 and AC2 427. The rectified voltage with respect to the ground appears on node A 430. When the voltage on node A 430 exceeds a turn-on voltage threshold, then controller 410 turns on and the gate drive to MOSFET Q2 420 is enabled. In this example, the turn-on voltage threshold is set by the resistor divider R4 440 and R5 441, and the controller 410. At the same time, the control loop 450 is enabled and capacitor C5 455 is internally connected to the output of an internal error amplifier in the controller 410. In certain examples, this connection is realized using an internal switch inside the controller 410 that connects the output of the internal error amplifier to a "COMP" pin on the controller 410.

The voltage across the LED string with the desired amount of current in the LED is assumed to be VLED 460. In certain embodiments, the turn-on threshold voltage at node A 430 should be greater than VLED 460. Once the voltage on node A 430 falls below a turn-off threshold voltage, the gate drive to the switching MOSFET Q2 420 is disabled and the internal switch from the output of the internal error amplifier is disconnected from the "COMP" pin. This will prevent any discharge of the capacitor C5 455. The turn-off voltage threshold should also be higher than VLED 460 for proper operation. Examples of the turn-on voltage threshold and the turn-off voltage threshold are provided in plot 470.

In certain embodiments, the current through a first inductor is shown as Iprog 475 being equal to the voltage on the reference pin (REFI) 482 divided by the voltage on resistor R2 483. To prevent excess overshoot and undershoot on the current through the inductor 480 when the switching is enabled, the difference in the turn-on voltage threshold and the turn-off voltage threshold should be minimized. In certain situations, too small a difference will cause oscillatory behavior and will result in visible flickering on the light output.

One skilled in the art will recognize that the above-described structures and methods may be applied to many different types of LED driver circuits including both isolated and non-isolated topologies. For example, buck-boost and flyback topologies may also be realized with the performance enhancements described above.

One skilled in the art will recognize that other components and functionality may be inserted within the specific examples shown in the figures. Additionally, these examples may be modified to handle different power characteristics of LEDs, LED strings.

It will be appreciated to those skilled in the art that the preceding examples and embodiments are exemplary and are for purposes of clarity and understanding and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is, therefore, intended that the following appended claims include all such modifications, permutation and equivalents as fall within the true spirit and scope of the present invention.

I claim:

1. A dimmable LED driver apparatus comprising:
an input interface coupled to a power source and dimmer, the input interface receives an input voltage from the power source and dimmer;
a sensor coupled to the power source and dimmer, the sensor detects a first voltage on the input voltage and generates a sensed voltage signal representative of a voltage drop on the input voltage caused by a dimmer;
a control loop coupled to receive the sensed voltage and compare the sensed voltage to a first threshold level and a second threshold level, the control loop generating a control signal based on a comparison of the sensed voltage to the first threshold level and the second threshold level;
a regulator and control block coupled to receive the control signal, the regulator and control block generates an LED driver signal based at least in part on the control signal; and
an output interface comprising a capacitor, the LED driver signal is provided to an LED array at the output interface.

2. The dimmable LED driver apparatus of claim 1 further comprising a diode bridge coupled between the sensor and the regulator and control block, the diode bridge converts the input voltage, which is an alternating current signal, to a direct current signal.

3. The dimmable driver apparatus of claim 2 further comprising an EMI filter, coupled between the diode bridge and the regulator and control block, the EMI filter reduces the amount of electromagnetic interference on the direct current signal generated by the diode bridge.

4. The dimmable driver apparatus of claim 1 wherein the regulator and control block comprises an offline buck LED driver.

5. The dimmable driver apparatus of claim 1 wherein the regulator and control block comprises an offline buck-boost LED driver.

6. The dimmable driver apparatus of claim 1 wherein the regulator and control comprises a flyback LED driver.

7. The dimmable driver apparatus of claim 1 wherein the sensed voltage signal is proportional to a dimming value generated by a dimmer in the power source and dimmer.

8. A dimmable LED driver apparatus comprising:
an input interface coupled to a power source and dimmer, the input interface receives an input alternating current signal from the power source and dimmer;
a diode bridge coupled to receive the input voltage, the diode bridge converts the input alternating current signal into a direct current signal;
a sensor coupled to receive the direct current signal, the sensor detects a first voltage on the direct current signal and generates a sensed voltage signal representative of a voltage drop on the direct current signal caused by a dimmer;
a control loop coupled to receive the sensed voltage and compare the sensed voltage to a first threshold level and a second threshold level, the control loop generating a control signal based on a comparison of the sensed voltage to the first threshold level and the second threshold level;
a regulator and control block coupled to receive the control signal, the regulator and control block generates an LED driver signal based at least in part on the control signal; and
an output interface comprising a capacitor, the LED driver signal is provided to an LED array at the output interface.

9. The dimmable driver apparatus of claim 8 further comprising an EMI filter, coupled between the sensor and the regulator and control block, the EMI filter reduces the amount of electromagnetic interference on the direct current signal.

10. The dimmable driver apparatus of claim 8 wherein the regulator and control block comprises an offline buck LED driver.

11. The dimmable driver apparatus of claim 8 wherein the regulator and control block comprises an offline buck-boost LED driver.

12. The dimmable driver apparatus of claim 8 wherein the regulator and control comprises a flyback LED driver.

13. The dimmable driver apparatus of claim 8 wherein the sensed voltage signal is proportional to a dimming value generated by a dimmer in the power source and dimmer.

14. A method of generating an LED driver signal representative of an offline dimming operation, the method comprising:
receiving an input signal from a power source and dimmer, the input having a voltage drop caused by a dimming operation;

sensing the voltage drop on the input signal and generating a sensed voltage signal;

comparing the sensed voltage signal to a first threshold level and a second threshold level and generating a control signal based at least in part on the comparing step;

generating a regulated LED driver signal based at least in part on the control signal and at least one characteristic of an LED array; and providing the regulated LED driver signal to the LED array via an output interface that comprises a capacitor.

15. The method of claim 14 wherein the input signal is an alternating current signal and the sensed voltage drop is identified on the alternating current input signal.

16. The method of claim 15 wherein the alternating current input signal is converted to a direct current signal using a diode bridge.

17. The method of claim 15 further comprising the step of removing at least a portion of electromagnetic interference on the direct current signal using an EMI filter.

18. The method of claim 14 wherein the input signal is a direct current signal generated by a diode bridge that converts the an alternating current on the input signal into a direct current signal.

19. The method of claim 18 further comprising the step of removing at least a portion of electromagnetic interference on the direct current signal using an EMI filter.

20. The method of claim 14 wherein the sensed voltage signal is proportional to a dimming value generated by a dimmer in the power source and dimmer.

\* \* \* \* \*